UNITED STATES PATENT OFFICE.

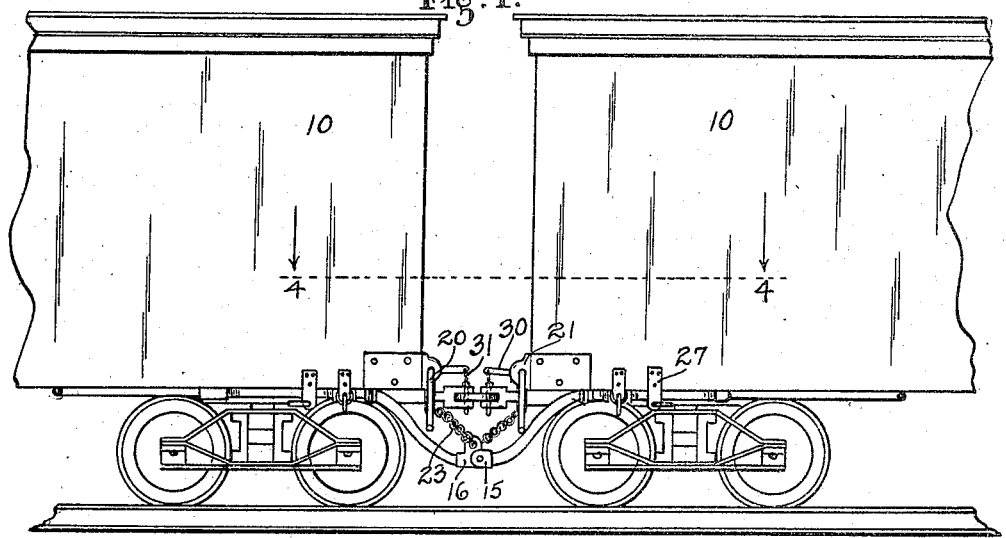
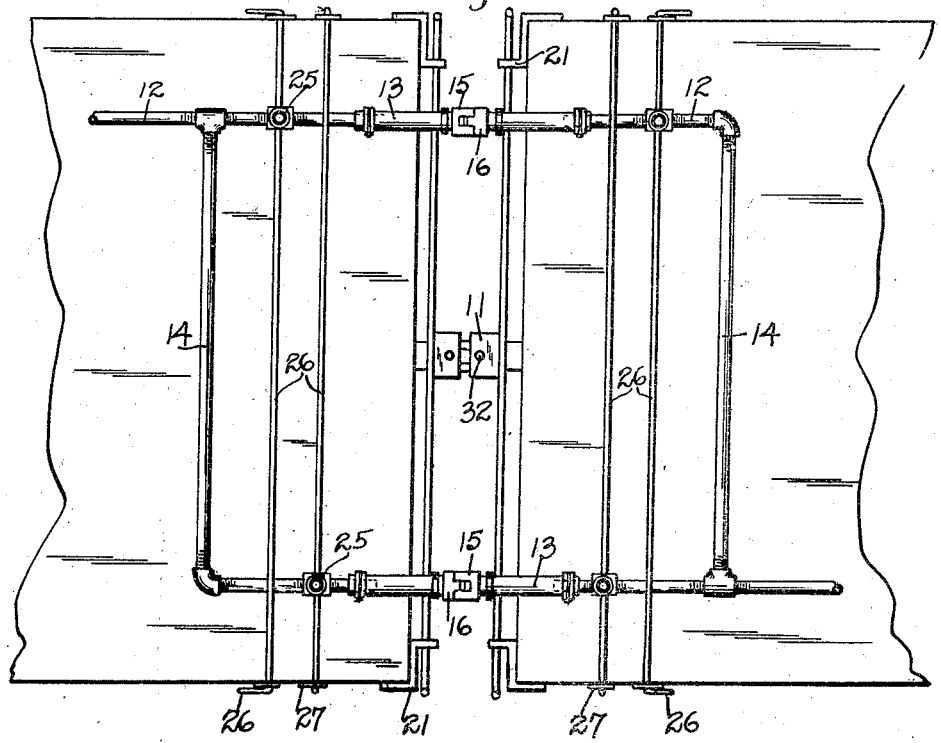

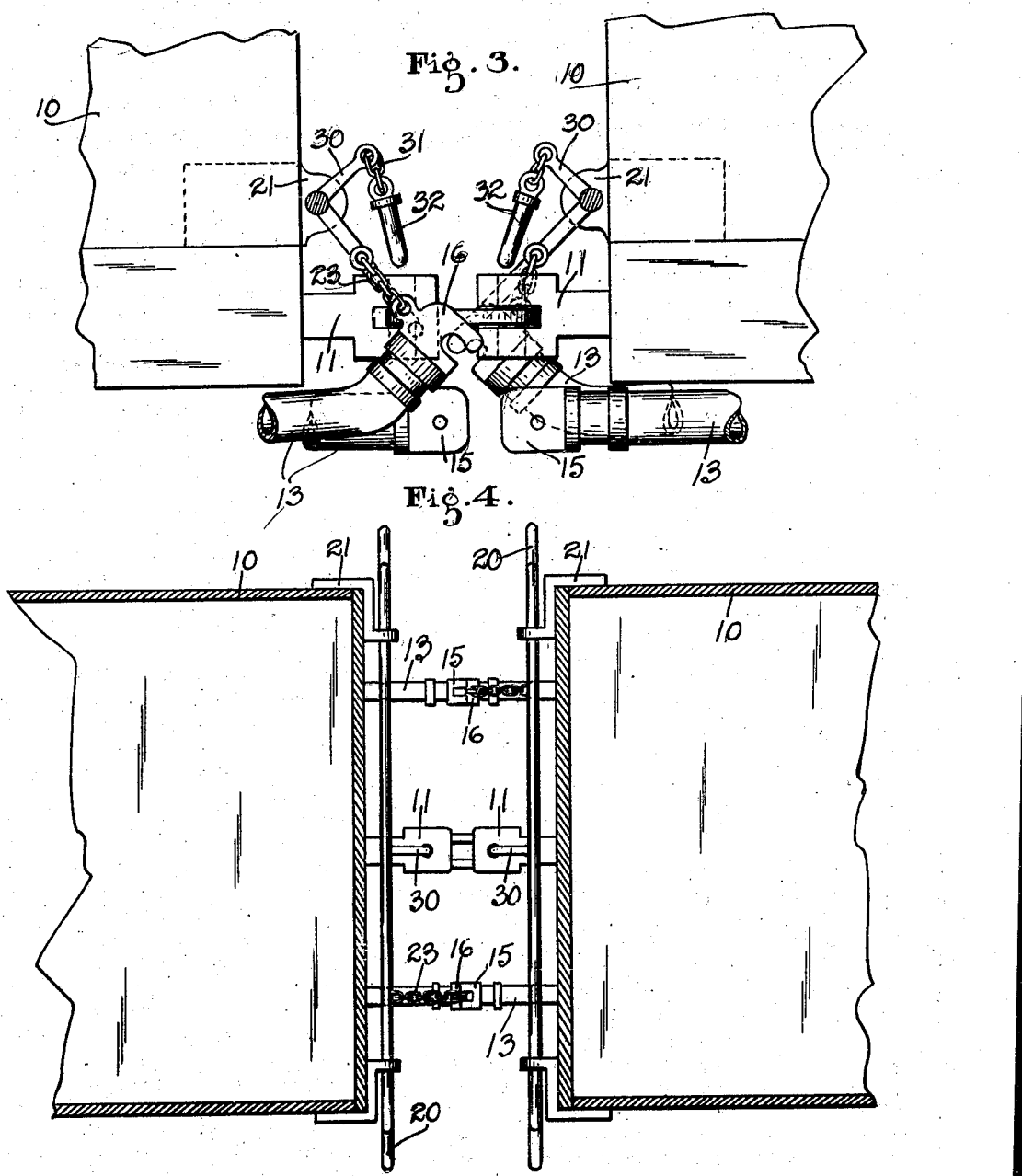

JAMES MERRYWEATHER, OF GREENCASTLE, INDIANA.

TRAIN-PIPE CONNECTION.

1,121,522.  Specification of Letters Patent.  Patented Dec. 15, 1914.

Application filed October 19, 1912. Serial No. 726,735.

*To all whom it may concern:*

Be it known that I, JAMES MERRYWEATHER, a citizen of the United States, and a resident of Greencastle, county of Putnam, and State of Indiana, have invented a certain new and useful Train-Pipe Connection, and do hereby declare that the following is a full, clear, and exact description thereof, reference being had to the accompanying drawings.

The object of this invention is to provide air-brake connections between cars which can be coupled or uncoupled and otherwise operated entirely from either side of the cars.

At present the air-brake coupling is midway between the two sides between the cars and under the car coupling and the operator is required to crawl down between the cars for coupling and uncoupling the air-brake system and thus jeopardize his life. This invention is to obviate said danger.

The nature of the invention will be understood from the accompanying drawings and the following description and claims.

In the drawings Figure 1 is a side elevation of the adjacent end portions of the two cars coupled together. Fig. 2 is a bottom view of two car bodies shown in Fig. 1. Fig. 3 is an enlarged fragmental detail of the coupling members. Fig. 4 is a section on the line 4—4 of Fig. 1.

In the drawings, there is shown two cars 10 adapted to be coupled together by the coupling members 11 mid-way between the sides of the cars. So far as this invention is concerned any coupling may be used for this purpose.

Under each car there is secured near one side an air-line or train pipe 12 for the air-brake system and it extends throughout the length of the cars; in the drawings herein they are on opposite sides of the two cars. Each line pipe 12 extends almost to the end of the car and on the end thereof there is a rubber hose 13. Near each end of each line pipe 12 there is a branch pipe 14 extending transversely of the car to the other side and at the other side turns longitudinally and is continued almost to the end of the car like the main pipe at the other side of the car. The ends of the main pipe and the branch pipes are in alinement with each other on the two cars so as to furnish two lines of pipe at the ends of the cars, one near each side. Each of these pipes has on its end a hose coupling section 13 which extends beyond the end of the car. And on one hose coupling section of each pair there is a female coupling member 15 and on the other one a male coupling member 16 engaging each other so that they can be operated by merely lifting the male coupling member upward.

At each end of the car there is a transverse rod 20 mounted in brackets 21 and with both ends thereof turned to form handles whereby the rod can be operated. This rod is above the hose couplings and an arm 22 extends from the rod 20 over one pair of hose couplings and is connected with the male coupling member 16 by a chain 23. The rod 20 on one car is arranged in that manner to uncouple one pair of hose sections 13 and the rod 20 on the other car is arranged to uncouple the other pair of hose couplings. Therefore, the air may pass through either set of couplings or both, if both are coupled, although the latter is not necessary. It is immaterial as to which set of couplings is connected, for either can be operated, that is coupled or uncoupled, from either side of the train. In practice the operator will couple the pair of hose couplings near the side of the train where he is standing, but it can be uncoupled from either side of the train through the rod 20.

In order to control the air in coupling or uncoupling the lines from either side of the train, a valve 25 is placed on each line pipe and also one on each branch pipe and each of these valves is operated by a rod 26 connected therewith and extending beyond each side of the car and mounted in brackets 27. Therefore, each of the four valves can be operated from either side of the car.

In operation, the operator couples the line near the side of the train on which he is standing and turns off the air in the line near the other side of the train and turns on the air in the line which he has just coupled. In uncoupling he does just the reverse.

An arm 30 extends from the middle part of each rod 20 over the coupling members 11 and carries a chain 31 connected with the coupling pin 32, whereby the rods 20, when operated for uncoupling besides uncoupling the air-brake will simultaneously raise the coupling pin, and, when the air-brake is coupled the coupling pin will also be released simultaneously.

The cardinal or salient features of the present invention reside in the fact that the train pipes carried by the cars are each provided with a pair of terminals at each end, the terminals of the train pipes being disposed near the sides of the cars, and each terminal having a valve, the operating means for each valve being readily accessible from both sides of the respective car, and there being hose sections attached to the pipe terminals, the hose sections being readily accessible from the sides of the cars, coupling members being carried by the free ends of the hose sections, and means being carried by each of the cars for detaching one coupling member of one pair from both sides of the car. It is to be noted that each valve of the train pipe terminals is provided with a transverse stem having a pair of handles readily accessible from the opposite sides of the respective car, for enabling each valve to be controlled from each side of the car. Therefore, with this construction the air-brake and the car couplers can be operated from either side of the train without the operator getting between the cars to any extent.

While I have referred to my pipe connections as air connections, I do not wish to limit myself to this one use as it is evident they could be used for other purposes or another similar set of pipes could be installed for steam or other use and be operated in the same manner and by the same rod 20.

I claim as my invention:

1. The combination with railway cars, of train pipes carried thereby, each train pipe having a pair of terminals, the terminals of the train pipes being disposed near the sides of the cars, a valve for each terminal, operating means for each valve and readily accessible from both sides of the respective car, hose sections attached to the terminals, the hose sections being readily accessible from the sides of the cars, coupling members carried by the free ends of the hose sections, and means carried by each of the cars for detaching one coupling member of one pair from both sides of the car.

2. The combination with railway cars, of a train pipe for each car having a pair of terminals, the terminals being disposed near the sides of the cars, a valve for each terminal, each valve having a transverse stem, the valve stems each having a pair of handles readily accessible from the opposite sides of the respective car, hose sections attached to the terminals, the hose sections being readily accessible from the sides of the cars, coupling members attached to the free ends of the hose sections, releasing shafts journaled to the ends of the cars and extending to the sides of the cars and having terminal handles, each shaft having an arm secured thereto, and a flexible element connecting the free end of each arm to one coupling member of one pair to detach the same.

In witness whereof, I have hereunto affixed my signature in the presence of the witnesses herein named.

JAMES MERRYWEATHER.

Witnesses:
JAMES W. COOPER,
MAT J. MURPHY.

Copies of this patent may be obtained for five cents each, by addressing the "Commissioner of Patents, Washington, D. C."